(12) United States Patent
Teraya

(10) Patent No.: US 9,732,680 B2
(45) Date of Patent: Aug. 15, 2017

(54) CONTROL DEVICE AND CONTROL METHOD OF VEHICLE

(71) Applicant: Toyota Jidosha Kabushiki Kaisha, Toyota-shi, Aichi-ken (JP)

(72) Inventor: Ryuta Teraya, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 59 days.

(21) Appl. No.: 15/019,098

(22) Filed: Feb. 9, 2016

(65) Prior Publication Data

US 2016/0237919 A1   Aug. 18, 2016

(30) Foreign Application Priority Data

Feb. 13, 2015 (JP) .................................. 2015-026234

(51) Int. Cl.
| | | |
|---|---|---|
| *F01L 1/34* | (2006.01) | |
| *F02D 13/08* | (2006.01) | |
| *F01L 1/344* | (2006.01) | |
| *F01L 9/04* | (2006.01) | |

(52) U.S. Cl.
CPC .............. *F02D 13/08* (2013.01); *F01L 1/344* (2013.01); *F01L 9/04* (2013.01); *Y02T 10/18* (2013.01)

(58) Field of Classification Search
CPC .. F01L 1/344; F01L 9/04; F02D 13/08; Y02T 10/18

USPC ............................................ 123/90.15, 90.17
See application file for complete search history.

(56) References Cited

U.S. PATENT DOCUMENTS 8,210,141 B2 *   7/2012  Nakamura ............ F01L 1/3442
                                                    123/90.15

FOREIGN PATENT DOCUMENTS

| JP | 2014-058217 A | 4/2014 |
|---|---|---|
| JP | 2014-152660 A | 8/2014 |

* cited by examiner

*Primary Examiner* — Ching Chang
(74) *Attorney, Agent, or Firm* — Dinsmore & Shohl LLP

(57) ABSTRACT

A control device for a vehicle including an engine, the engine including an electric VVT mechanism, the electric VVT mechanism that changes a valve timing of at least either one of an intake valve and an exhaust valve, the control device includes an ECU. The ECU is configured to: perform a crankshaft stop position control to control a rotation stop position of a crankshaft during a stop process of stopping the engine, such that a valve opening degree in which at least either one of a first gap between the intake valve and the corresponding valve seat and a second gap between the exhaust valve and the corresponding valve seat is fully closed or becomes a predetermined gap or more is set as a target valve opening degree; and operate the electric VVT mechanism until the valve opening degree reaches the target valve opening degree, when the engine stops.

10 Claims, 7 Drawing Sheets

CONTROL DEVICE AND CONTROL METHOD OF VEHICLE

INCORPORATION BY REFERENCE

The disclosure of Japanese Patent Application No. 2015-026234 filed on Feb. 13, 2015 including the specification, drawings and abstract is incorporated herein by reference in its entirety.

BACKGROUND

1. Technical Field

The disclosure relates to a control device and a control method of a vehicle including an engine having an electric variable valve timing mechanism.

2. Description of Related Art

Japanese Patent Application Publication No. 2014-058217 (JP 2014-058217 A) describes a technique to control a stop position of a crankshaft of an engine to a target position at the time of an engine stop in order to appropriately perform a next start of the engine. In JP 2014-058217 A, in a hybrid vehicle, the stop position of the crankshaft at the time of the engine stop is adjusted by use of a motor generator, so that opening degrees of an intake valve and an exhaust valve become larger than a predetermined opening degree. This restrains formation of ice in respective gaps between the intake valve and its corresponding valve seat and between the exhaust valve and its corresponding valve seat.

SUMMARY

However, the adjustment of the stop position of the crankshaft by use of the motor generator may have limitations on control accuracy of the stop position of the crankshaft. Accordingly, further improvement of the accuracy about the control on valve opening degrees of the intake valve and the exhaust valve is required.

The disclosure provides a control device and a control method of a vehicle, and the control device and the control method achieve highly accurate adjustment of valve opening degrees of an intake valve and an exhaust valve at the time of an engine stop.

An example aspect of the disclosure provides a control device for a vehicle, the vehicle including an engine, the engine including an intake valve, an exhaust valve, a first valve seat corresponding to the intake valve, a second valve seat corresponding to the exhaust valve, a crankshaft, a camshaft and an electric variable valve timing mechanism, the electric variable valve timing mechanism is configured to change a rotational phase of the camshaft relative to the crankshaft so as to change a valve timing of at least either one of the intake valve and the exhaust valve, the control device includes an electronic control unit. The electronic control unit is configured to: perform a crankshaft stop position control to control a rotation stop position of the crankshaft during a stop process of stopping the engine, such that a valve opening degree in which at least either one of a first gap between the intake valve and the first valve seat and a second gap between the exhaust valve and the second valve seat is fully closed or becomes a predetermined gap or more is set as a target valve opening degree; and operate the electric variable valve timing mechanism until the valve opening degree reaches the target valve opening degree, when the engine stops.

According to the above configuration, the electric variable valve timing mechanism can be operated until the valve opening degree reaches the target valve opening degree, after the engine has stopped. On that account, when the electric variable valve timing mechanism is operated by setting, as the target valve opening degree, a valve opening degree that restrains formation of ice in respective gaps between the intake valve and its corresponding valve seat and between the exhaust valve and its corresponding valve seat, it is possible to restrain occurrence of noise, vibration, and the like caused due to freezing in the valve at the time of a next start of the engine.

In the control device, the electronic control unit may be configured such that, in a case where a magnitude of a difference between the valve opening degree and the target valve opening degree is larger than a first threshold when the engine stops, the electronic control unit may be configured to operate the electric variable valve timing mechanism until the valve opening degree reaches the target valve opening degree.

According to the above configuration, in a case where the magnitude of the difference between the valve opening degree and the target valve opening degree is larger than the first threshold after the engine has stopped, the electric variable valve timing mechanism is operated until the valve opening degree reaches the target valve opening degree, thereby making it possible to surely cause the valve opening degree to reach the target valve opening degree. On that account, when the electric variable valve timing mechanism is operated by setting, as the target valve opening degree, a valve opening degree that restrains the formation of ice in respective gaps between the intake valve and its corresponding valve seat and between the exhaust valve and its corresponding valve seat, for example, it is possible to restrain occurrence of noise, vibration, and the like caused due to freezing in the valve at the time of a next start of the engine.

In the control device, the electronic control unit may be configured such that in a case where the magnitude of the difference between the valve opening degree and the target valve opening degree is smaller than a second threshold when the engine stops, the electronic control unit may be configured to operate the electric variable valve timing mechanism until the valve opening degree reaches the target valve opening degree; and the second threshold may be a value larger than the first threshold.

According to the above configuration, in a case where the valve opening degree largely deviates from the target valve opening degree, if the electric variable valve timing mechanism is operated for a long time, noise, vibration, and the like may be rather caused. In view of this, only in a case where the valve opening degree does not largely deviate from the target valve opening degree, the electric variable valve timing mechanism is operated until the valve opening degree reaches the target valve opening degree, thereby making it possible to restrain the occurrence of noise, vibration, and the like.

In the control device, the second threshold may be set within a range in which the valve opening degree does not exceed its peak when the valve opening degree is changed to the target valve opening degree.

According to the above configuration, in a case where the electric variable valve timing mechanism is operated until the valve opening degree reaches the target valve opening degree, it is possible to restrain the occurrence of noise, vibration, and the like caused when the valve opening degree exceeds its peak.

In the control device, the vehicle may further includes a rotary electric machine that is able to rotate the crankshaft. The electronic control unit may be configured to perform the crankshaft stop position control during the stop process, the crankshaft stop position control being a control to operate the rotary electric machine so that the rotation stop position of the crankshaft reaches a predetermined position. The electronic control unit may be configured to operate the electric variable valve timing mechanism until the valve opening degree reaches the target valve opening degree, when the engine stops.

According to the above configuration, the rotation stop position of the crankshaft is brought to a predetermined position by use of the rotary electric machine, so that the valve opening degree can be controlled to the target valve opening degree. This makes it possible to restrain the valve opening degree from largely deviating from the target valve opening degree.

In the control device, the electronic control unit may be configured to operate the electric variable valve timing mechanism until a predetermined time elapses, after the engine has stopped.

According to the above configuration, it is possible to restrain such a situation that a driver feels uncomfortable due to noise, vibration, and the like caused when the electric variable valve timing mechanism operates for a long time after the engine has stopped.

In the control device, the vehicle may further includes an electric device. The electronic control unit may be configured to execute the stop process when an interruption of power supply to the electric device is requested. The electronic control unit may be configured to operate the electric variable valve timing mechanism until the valve opening degree reaches the target valve opening degree, after the engine has stopped.

According to the above configuration, in a case where the vehicle may be left for a long time, the electric variable valve timing mechanism can be operated until the valve opening degree reaches the target valve opening degree.

In the control device, the target valve opening degree may be a valve opening degree that restrains formation of ice in the first gap and the second gap.

According to the above configuration, by controlling the valve opening degree to the target valve opening degree after the engine has stopped, it is possible to restrain ice from being formed in respective gaps between the intake valve and its corresponding valve seat and between the exhaust valve and its corresponding valve seat.

In the control device, the vehicle may further includes a detection device that detects a rotation position of the crankshaft. The electronic control unit may be configured to calculate the valve opening degree based on the rotation position of the crankshaft which is detected by the detection device.

According to the above configuration, it is possible to easily grasp the valve opening degree based on the rotation position of the crankshaft.

According to the above configuration, the electric variable valve timing mechanism can be operated until the valve opening degree reaches the target valve opening degree, after the engine has stopped. On that account, when the electric variable valve timing mechanism is operated by setting, as the target valve opening degree, a valve opening degree that restrains formation of ice in respective gaps between the intake valve and its corresponding valve seat and between the exhaust valve and its corresponding valve seat, it is possible to restrain occurrence of noise, vibration, and the like caused due to freezing in the valve at the time of a next start of the engine. This accordingly makes it possible to provide a control device for a vehicle, the control device being configured to highly accurately adjust opening degrees of an intake valve and an exhaust valve at the time of an engine stop.

Another example aspect of the disclosure provides a control method for a vehicle, the vehicle including an engine, the engine including an intake valve, an exhaust valve, a first valve seat corresponding to the intake valve, a second valve seat corresponding to the exhaust valve, a crankshaft, a camshaft and an electric variable valve timing mechanism, the electric variable valve timing mechanism is configured to change a rotational phase of the camshaft relative to the crankshaft so as to change a valve timing of at least either one of the intake valve and the exhaust valve, the control method includes: controlling a rotation stop position of the crankshaft during a stop process of stopping the engine, such that a valve opening degree in which at least either one of a first gap between the intake valve and the first valve seat and a second gap between the exhaust valve and the second valve seat is fully closed or becomes a predetermined gap or more is set as a target valve opening degree; and operating the electric variable valve timing mechanism until the valve opening degree reaches the target valve opening degree, when the engine has stopped.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

With reference to drawings, the following describes an embodiment. In the following description, the same reference sign is assigned to the same components. Names and functions thereof are also the same. Accordingly, detailed descriptions thereof are not repeated.

Figure 1:
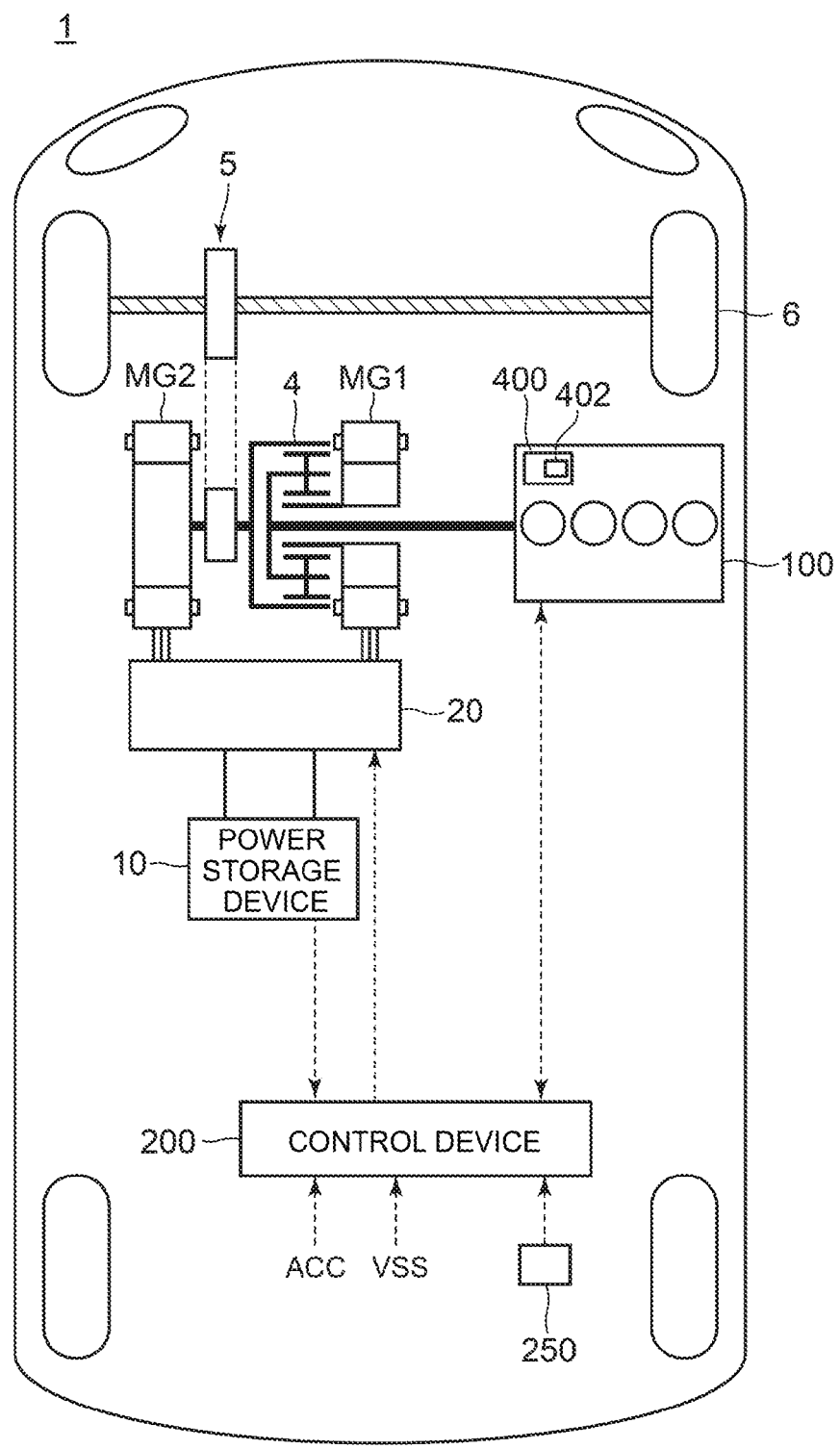
FIG. 1 is a block diagram illustrating an overall configuration of a vehicle according to an embodiment.

As illustrated in FIG. 1, a hybrid vehicle (hereinafter just referred to as the vehicle) 1 according to the present embodiment includes an engine 100, motor generators MG1, MG2, a power distribution device 4, a speed reducer 5, drive wheels 6, a power storage device 10, a power control unit (PCU) 20, a control device 200, and a start switch 250.

The vehicle 1 can run by a driving force output from at least one of the engine 100 and the motor generator MG2. The engine 100 is constituted by an internal combustion engine such as a gasoline engine or a diesel engine, for example. The engine 100 supplies a power to at least either the drive wheels 6 or the motor generator MG1 performable as a generator, via the power distribution device 4.

The engine 100 can start by being cranked by the motor generator MG1. The engine 100 includes an electric variable valve timing mechanism (hereinafter referred to as the electric VVT mechanism) 400 that changes an operating characteristic of an intake valve (more specifically, a relative position of the intake valve with respect to a rotation position (a cam angle) of a camshaft) by use of an electric actuator 402. The electric VVT mechanism 400 is controlled by the control device 200 according to a running state of the vehicle and startability of the engine 100. An exhaust passage of the engine 100 is provided with an exhaust gas purifier that purifies an exhaust gas of the engine 100 by use of a catalyst. Details of the engine 100, the electric VVT mechanism 400, and the exhaust gas purifier will be described later.

The power distribution device 4 is configured to split a driving force generated from the engine 100 into a power to drive the drive wheels 6 via the speed reducer 5 and a power to drive the motor generator MG1. The power distribution device 4 is constituted by a planetary gear mechanism, for example. In this case, for example, the motor generator MG1 is connected to a sun gear of the planetary gear mechanism, the engine 100 is connected to a carrier of the planetary gear mechanism, and the drive wheels 6 are connected to a ring gear of the planetary gear mechanism via the motor generator MG2 and the speed reducer 5.

The motor generators MG1, MG2 are AC rotary electric machines, and are three-phase AC synchronous motor generators, for example. The motor generator MG1 can generate an electric power by use of the power received from the engine 100 via the power distribution device 4. For example, when a state of charge (SOC) of the power storage device 10 reaches to a predetermined lower limit, the engine 100 starts so that the motor generator MG1 generates an electric power. The electric power generated by the motor generator MG1 is subjected to voltage conversion by the PCU 20, and then temporarily stored in the power storage device 10 or directly supplied to the motor generator MG2.

The motor generator MG2 generates a driving force by use of at least one of the electric power stored in the power storage device 10 and the electric power generated by the motor generator MG1. The driving force of the motor generator MG2 is transmitted to the drive wheels 6 via the speed reducer 5. Note that, in FIG. 1, the drive wheels 6 are illustrated as front wheels, but rear wheels may be driven by the motor generator MG2 instead of the front wheels or together with the front wheels.

Note that, at the time of braking of the vehicle, the motor generator MG2 is driven by the drive wheels 6 via the speed reducer 5, so that the motor generator MG2 operates as a generator. Hereby, the motor generator MG2 operates as a regeneration brake that converts a brake energy into an electric power. The electric power generated by the motor generator MG2 is stored in the power storage device 10.

The PCU 20 is a driving device for driving the motor generators MG1, MG2. The PCU 20 includes an inverter for driving the motor generators MG1, MG2, and may further include a converter for converting a voltage between the inverter and the power storage device 10.

The power storage device 10 is a direct-current power supply that is rechargeable, and is constituted by a secondary battery such as a nickel metal hydride battery or a lithium ion battery. A voltage of the power storage device 10 is, for example, around 200 V. The electric powers generated by the motor generators MG1, MG2 are stored in the power storage device 10. Note that a large-capacity capacitor can be employed as the power storage device 10, and any electric power buffer can be employed as the power storage device 10 provided that the electric power buffer is able to temporarily store the electric powers generated by the motor generators MG1, MG2 and can supply the electric powers thus stored to the motor generator MG2. Further, the power storage device 10 is provided with sensors for detecting a temperature, a voltage, and a current of the power storage device 10, and detection values by the sensors are output to the control device 200.

The start switch 250 is a push-type switch, for example. The start switch 250 may be configured such that a key is inserted into a key cylinder and rotated to a predetermined position. The start switch 250 is connected to the control device 200. When a driver operates the start switch 250, the start switch 250 transmits a signal ST to the control device 200.

The control device 200 is constituted by an electronic control unit (ECU) including a central processing unit (CPU), a storage device, input and output buffers, etc., (which are not shown herein). The control device 200 performs an input of signals (a signal ST, an accelerator opening degree ACC, a vehicle speed VSS, and the like) from the start switch 250 and various sensors and an output of a control signal to each device. The control device 200 also performs a control on each device in the hybrid vehicle 1. Mainly, the control device 200 executes a running control of the hybrid vehicle 1 and a control on the engine 100 (e.g., the electric VVT mechanism 400 or the like) according to the running control.

Further, in a case where the control device 200 receives the signal ST in a state where power supply to an electric device provided in the vehicle 1 is interrupted, for example, the control device 200 causes a state where the power supply to the electric device provided in the vehicle 1 is performable, that is, a state where the vehicle 1 can run.

On the other hand, in a case where the control device 200 receives the signal ST in a state where the power supply to the electric device provided in the vehicle 1 is performable (or a state where the signal ST is received continues for a predetermined time), for example, the control device 200 interrupts the power supply to the electric device provided in the vehicle 1. Note that other operations of the control device 200 will be described later.

Figure 2:
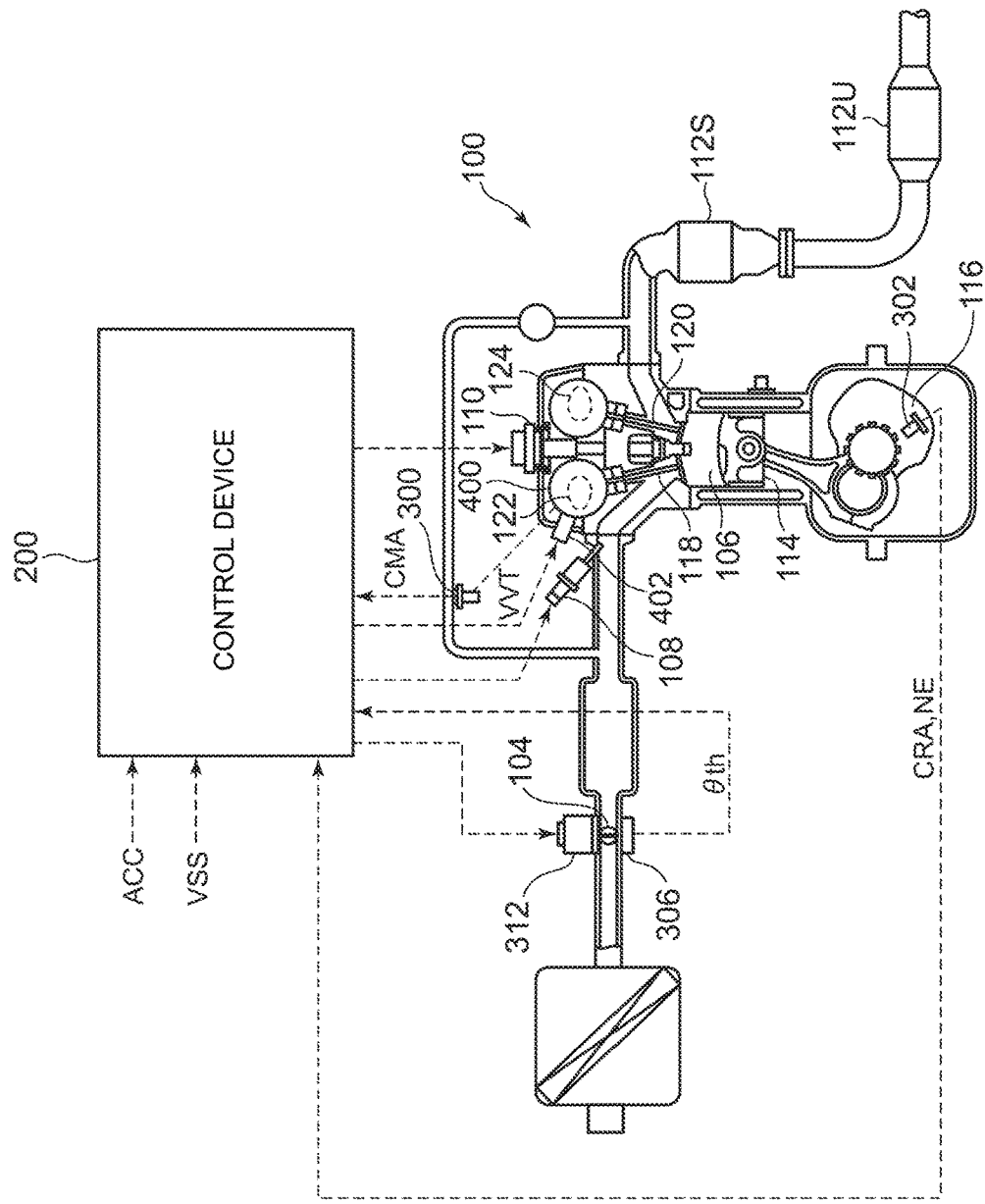
FIG. 2 is a configuration diagram of an engine.

Next will be described a configuration of the engine 100 including the electric VVT mechanism 400. FIG. 2 is a view illustrating a specific configuration of the engine 100 illustrated in FIG. 1.

Referring now to FIG. 2, an intake-air amount to the engine 100 is adjusted by a throttle valve 104 driven by a throttle motor 312. An injector 108 injects a fuel into an intake port. In the intake port, the fuel is mixed with air. When an intake valve 118 is opened, the fuel/air mixture is introduced into a cylinder 106. Note that the injector 108 may be provided as a direct-injection injector that directly injects the fuel into the cylinder 106. Alternatively, injectors 108 for port injection and for direct injection may be provided.

The fuel/air mixture in the cylinder 106 is ignited by an ignition plug 110 and then burns. The fuel/air mixture after the burning, that is, an exhaust gas is exhausted to an exhaust passage. The exhaust passage is provided with an exhaust gas purifier that purifies the exhaust gas by use of a catalyst. The exhaust gas purifier includes a catalyst 112S (hereinafter also referred to as a start cat (S/C) catalyst), and a catalyst 112U (hereinafter also referred to as an underfloor (U/F)

catalyst) placed on a downstream side relative to the S/C catalyst 112S. The exhaust gas is purified by the S/C catalyst 112S and the U/F catalyst 112U, and then exhausted outside the vehicle. A piston 114 is pushed down due to the burning of the fuel/air mixture, so that a crankshaft 116 rotates.

A head portion of the cylinder 106 is provided with the intake valve 118 and an exhaust valve 120. An amount of air introduced into the cylinder 106 and an introduction timing thereof are controlled by the intake valve 118. An amount of an exhaust gas exhausted from the cylinder 106 and an exhaust timing thereof are controlled by the exhaust valve 120. The intake valve 118 is driven by a cam 122, and the exhaust valve 120 is driven by a cam 124.

An operating characteristic of the intake valve 118 is changed by the electric VVT mechanism 400. The electric VVT mechanism 400 includes a camshaft, a cam sprocket (both not shown), and the electric actuator 402. The camshaft is rotatably provided in a cylinder head of the engine 100 so that a direction of a rotating shaft of the camshaft is parallel to a rotating shaft of the crankshaft. The camshaft includes an exhaust-side camshaft that opens and closes, by cams, exhaust valves provided in respective cylinders, and an intake-side camshaft that opens and closes, by cams, intake valves provided in respective cylinders. A plurality of cams 124 is fixed to the exhaust-side camshaft at predetermined intervals. A plurality of cams 122 is fixed to the intake-side camshaft at predetermined intervals.

A cam sprocket is provided in one end of each of the intake-side and the exhaust-side camshafts. The same timing chain is wound around the cam sprockets. The timing chain is also wound around a timing rotor (not shown) provided in the crankshaft 116. Accordingly, the crankshaft and the cam shaft rotate in synchronization with each other via the timing chain.

The electric actuator 402 is provided between the camshaft and the cam sprocket. The electric actuator 402 changes a rotation phase between the camshaft and the cam sprocket on the intake side. An operation of the electric actuator 402 is controlled based on a control signal VVT transmitted from the control device 200. When the electric actuator 402 changes the rotation phase between the camshaft and the cam sprocket on the intake side, a valve opening period is maintained in the intake valve 118, and a valve opening timing and a valve closing timing in association with the valve opening timing are changed. Hereby, a valve position of the intake valve 118 relative to a rotation position of the camshaft on the intake side is changed.

A change mode of the valve opening timing of the intake valve 118 by the electric VVT mechanism 400 will be described later. Note that the electric VVT mechanism 400 may change a valve opening timing of the exhaust valve 120 instead of or in addition to the intake valve 118.

Signals indicative of the accelerator opening degree ACC and the vehicle speed VSS and also signals from various sensors such as a cam angle sensor 300, a crank angle sensor 302, and a throttle position sensor 306 are input into the control device 200.

The cam angle sensor 300 outputs a signal indicative of a position CMA of the cam. The crank angle sensor 302 outputs a signal indicative of a rotation number (hereinafter also referred to as an engine rotation number) NE of the crankshaft 116 and a signal indicative of a rotation angle CRA of the crankshaft 116. The throttle position sensor 306 outputs a signal indicative of a throttle opening degree θth.

Further, the control device 200 controls the engine 100 based on the signals from these sensors. More specifically, the control device 200 controls a throttle opening degree θth, an ignition timing, a fuel injection timing, a fuel injection amount, and an operating state (an opening/closing timing) of the intake valve 118 so that the engine 100 is operated at a desired operation point according to a running state of the vehicle and a warm-up state of the exhaust gas purifier. Note that the operation point is a working point of the engine 100 at which an output, a torque, and a rotation number of the engine 100 are determined, and the operation point of the engine 100 is determined so that the engine 100 generates a desired output or torque.

The control device 200 sets a requested output to the engine 100 in the running control of the hybrid vehicle 1. Further, the control device 200 controls the aforementioned parameter group so that the engine 100 works at a working point (a combination of an engine rotation number and an engine torque) at which the engine 100 generates the requested output thus set.

Figure 3:
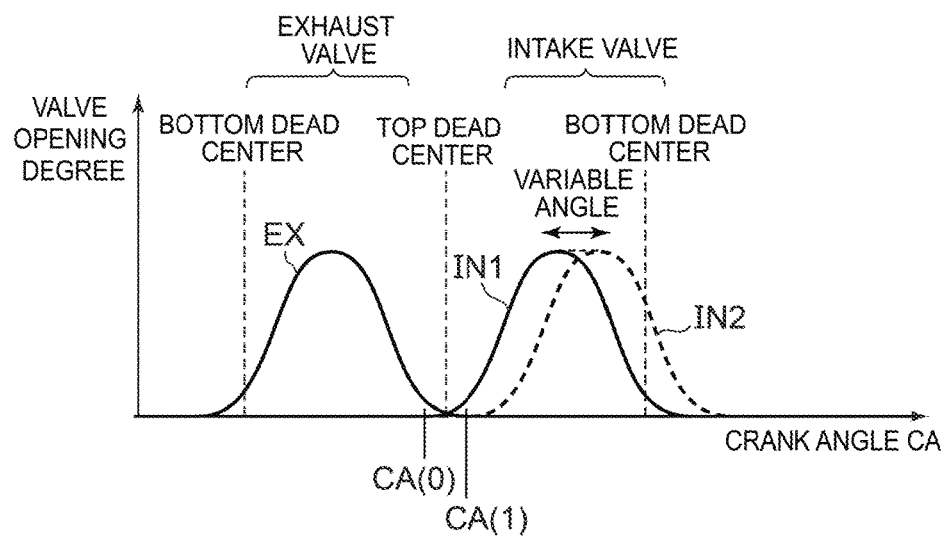
FIG. 3 is a view illustrating a relationship between a valve opening degree and a crank angle realized by an electric VVT mechanism.

FIG. 3 illustrates a relationship between a valve opening degree and a crank angle realized by the electric VVT mechanism 400. A vertical axis in FIG. 3 indicates a valve opening degree, and a horizontal axis in FIG. 3 indicates a crank angle.

As illustrated in FIG. 3, in an exhaust stroke, the exhaust valve 120 is opened, and after an opening degree thereof reaches its peak, the exhaust valve 120 is closed. After that, in an intake stroke, the intake valve 118 is opened, and after an opening degree thereof reaches its peak, the intake valve 118 is closed. A valve opening degree of the exhaust valve 120 is shown in a waveform EX, whereas a valve opening degree of the intake valve 118 is shown in waveforms IN1, IN2.

Note that the valve opening degree indicates a gap between the intake valve 118 (or the exhaust valve 120) and a valve seat from a state where the intake valve 118 is closed. A valve opening degree at the time when the opening degree of the intake valve 118 reaches the peak is referred to as a lift amount, and a range of a crank angle after the intake valve 118 is opened but before the intake valve 118 is closed is referred to as a working angle.

The electric VVT mechanism 400 changes a valve opening timing and a valve closing timing of the intake valve 118 in a state where the lift amount and the working angle are maintained. That is, the electric VVT mechanism 400 changes the valve opening timing of the intake valve 118 by changing its waveform between the waveform IN1 (a continuous line) and the waveform IN2 (a broken line) while a shape of the waveform is maintained. In the present embodiment, a crank angle CA(0) corresponds to a valve opening timing of the intake valve 118 in a case where the valve opening degree is changed in the waveform IN1, and a crank angle CA(1) corresponds to a valve opening timing of the intake valve 118 in a case where the valve opening degree is changed in the waveform IN2.

In the following description, if the valve opening timing is changed in a direction from the crank angle CA(0) to the crank angle CA(1), it is expressed that the valve opening timing is retarded, and if the valve opening timing is changed in a direction from the crank angle CA(1) to the crank angle CA(0), it is expressed that the valve opening timing is advanced. Further, in the present embodiment, the crank angle CA(0) is a most advanced valve opening timing, and the crank angle CA(1) is a most retarded valve opening timing.

Note that, in the present embodiment, FIG. 3 exemplifies the waveform IN1 of a most advanced valve opening degree of the intake valve 118 and the waveform IN2 of a most retarded valve opening degree of the intake valve 118.

However, a change range of the valve opening timing of the electric VVT mechanism 400 is not limited between CA(0) and CA(1) illustrated in FIG. 3 in particular. Further, the present embodiment describes that the most advanced valve opening timing of the intake valve 118 is set at a position where the most advanced valve opening timing overlaps with the valve closing timing of the exhaust valve 120, but CA(0) may be set so as not to overlap therewith.

In the present embodiment, at the time when the engine 100 stops, the control device 200 controls the electric VVT mechanism 400 so that the valve opening degree of the intake valve 118 changes into the valve opening degree in accordance with the waveform IN2 that achieves the most retarded valve opening degree.

In the vehicle 1 having the above configuration, for example, in order to appropriately perform a next start of the engine 100, the control device 200 may change a rotation stop position (a crank angle) of the crankshaft 116 to a target rotation position by use of the motor generator MG1 at the time when the engine 100 stops. This is to avoid a slight open state of the intake valve 118 and the exhaust valve 120 at a rotation stop position of the crankshaft 116 at the time when the engine 100 stops.

More specifically, in a case where a gap (hereinafter also referred to as an opening degree) between a valve body and a valve seat is slightly opened in at least either of the intake valve 118 and the exhaust valve 120 (that is, the gap is not more than a predetermined opening degree) at the time when the engine 100 stops, if the vehicle 1 is left for a long period under a low temperature, ice may be formed in the gap. Accordingly, in a case where the engine 100 is started in a state where the ice is formed in the gap, the ice gets caught between the valve body and the valve seat, which may cause noise, vibration, and the like at the time of the start of the engine 100. In view of this, by changing the rotation stop position (the crank angle) of the crankshaft 116 to the target rotation position at the time when the engine 100 stops, it is possible to avoid a slight open state of the intake valve 118 and the exhaust valve 120, thereby making it possible to restrain the occurrence of noise, vibration, and the like at the time of the start of the engine 100.

On the premise that the valve position of the intake valve 118 is a valve position in accordance with the waveform IN2 that achieves the most retarded valve opening timing, the target rotation position of the crankshaft 116 herein is, for example, a crank angle at which the formation of ice in a gap between each of the intake valve 118 and the exhaust valve 120 and its corresponding valve seat is restrained even if the vehicle 1 is left under a low temperature for a long period. A detail of the target rotation position will be described later.

With such a configuration, the formation of ice in the gap is restrained at the time of a next start, thereby making it possible to restrain the occurrence of noise, vibration, and the like caused due to the ice getting caught between the valve and the valve seat at the time of the start of the engine 100.

However, a rotational range that can achieve the target rotation position is small, and only the adjustment of the stop position of the crankshaft 116 by use of the motor generator MG1 has limitations on control accuracy of the stop position of the crankshaft 116. This accordingly requires further improvement of the accuracy about the control on the valve positions of the intake valve 118 and the exhaust valve 120.

In view of this, in the present embodiment, the control device 200 has such a feature that, during a stop process of stopping the engine 100, the control device 200 executes a crankshaft stop position control to control a rotation stop position of the crankshaft so that the valve opening degree of the intake valve 118 reaches the target valve opening degree, and after the engine 100 has stopped, the control device 200 operates the electric VVT mechanism 400 so that the valve opening degree reaches the target valve opening degree. Note that, in the present embodiment, the crankshaft stop position control indicates a control to change the rotation position of the crankshaft 116 to the target rotation position by use of the motor generator MG1, as described above.

With such a configuration, after the engine 100 has stopped, the electric actuator 402 can be operated until the valve opening degree of the intake valve 118 reaches the target valve opening degree. This accordingly makes it possible to restrain the occurrence of noise, vibration, and the like caused due to freezing in the valve at the time of the next start of the engine 100.

Figure 4:
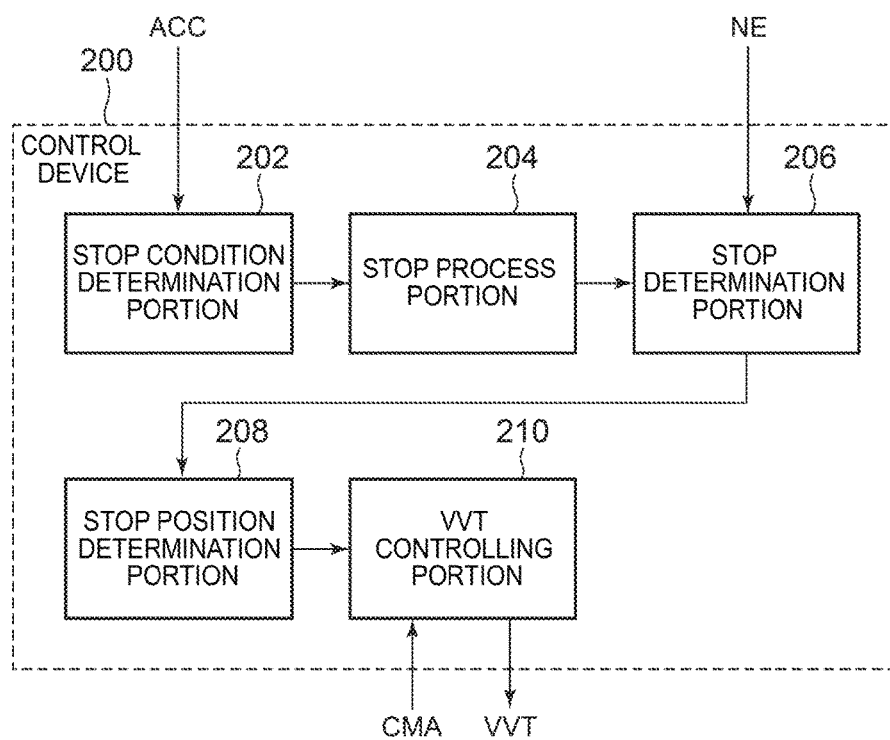
FIG. 4 is a functional block diagram of a control device.

FIG. 4 illustrates a functional block diagram of the control device 200 provided in the vehicle 1 according to the present embodiment. The control device 200 includes a stop condition determination portion 202, a stop process portion 204, a stop determination portion 206, a stop position determination portion 208, and a VVT controlling portion 210. Note that these constituents may be implemented by software such as a program, or may be implemented by hardware.

The stop condition determination portion 202 determines whether or not a stop condition of the engine 100 is established. The stop condition of the engine 100 includes at least any of the following conditions, for example: a condition that the accelerator opening degree ACC is smaller than a predetermined opening degree; a condition that a power calculated based on the accelerator opening degree ACC and requested to the vehicle 1 can be satisfied only by an output of the motor generator MG2; a condition that a forcible charging control to forcibly charge the power storage device 10 at the time when the SOC of the power storage device 10 falls short of a threshold is finished; and a condition that a driver operates the start switch 250 so that interruption of power supply to an electric device provided in the vehicle 1 is requested. In a case where at least any of the plurality of conditions is established, the stop condition determination portion 202 determines that the stop condition of the engine 100 is established.

When the stop condition determination portion 202 determines that the stop condition of the engine 100 is established, the stop process portion 204 executes a stop process on the engine 100. The stop process on the engine 100 includes the following controls: a control to stop fuel injection; a crankshaft stop position control to operate the motor generator MG1 so that the rotation position of the crankshaft 116 reaches the target rotation position; and a control to control a valve position (a VVT position) in the electric VVT mechanism 400 to a position in accordance with the waveform IN2 that achieves the most retarded valve opening timing. Note that, in a case where an engine rotation number NE is higher than a threshold, for example, the crankshaft stop position control performs a control to generate a torque in the motor generator MG1 so as to increase a rotational load of the engine 100 so that a decrease speed of the engine rotation number NE quickens. After that, the following control is performed: a torque is generated in the motor generator MG1 so that a change amount of the engine rotation number NE becomes small at a timing at which the engine rotation number NE falls short of the threshold. Then, a feedback control is performed on the torque of the motor generator MG1 which is given to the crankshaft 116 so that the rotation position of the crankshaft 116 reaches the target rotation position until the engine rotation number NE becomes zero.

Note that the crankshaft stop position control may operate the motor generator MG1 so that the rotation position of the crankshaft 116 reaches a predetermined position after the engine rotation number NE becomes zero in the course of events.

After the stop process portion 204 has executed the stop process on the engine 100, the stop determination portion 206 determines whether or not the engine 100 is in a stop state. For example, when the engine rotation number NE is substantially zero or when the engine rotation number NE is lower than a predetermined rotation number, the stop determination portion 206 determines that the engine 100 is in a stop state.

When the stop determination portion 206 determines that the engine 100 is in a stop state, the stop position determination portion 208 determines whether a difference between the rotation position of the crankshaft 116 and the target rotation position is larger than a threshold A but smaller than a threshold B (>threshold A), or not.

The threshold A is such a value that, when the rotation position of the crankshaft 116 largely deviates from the target rotation position by more than the threshold A, the intake valve 118 or the exhaust valve 120 of at least any of a plurality of cylinders (four cylinders in the present embodiment) of the engine 100 enters a state where ice may be formed in a gap between its valve body and its corresponding valve seat (that is, a state where the opening degree of the valve is larger than zero but not more than a predetermined value). The threshold A is a value of about 10° CA, for example.

In the present embodiment, the engine 100 is a four-cylinder engine. Accordingly, as the target rotation position of the crankshaft 116, such a crank angle is set that the formation of ice in respective gaps between all intake valves 118 and their corresponding valve seats and between all exhaust valves 120 and their corresponding valve seats is restrained (that is, the opening degree of the valve is larger than a predetermined value).

Figure 5:
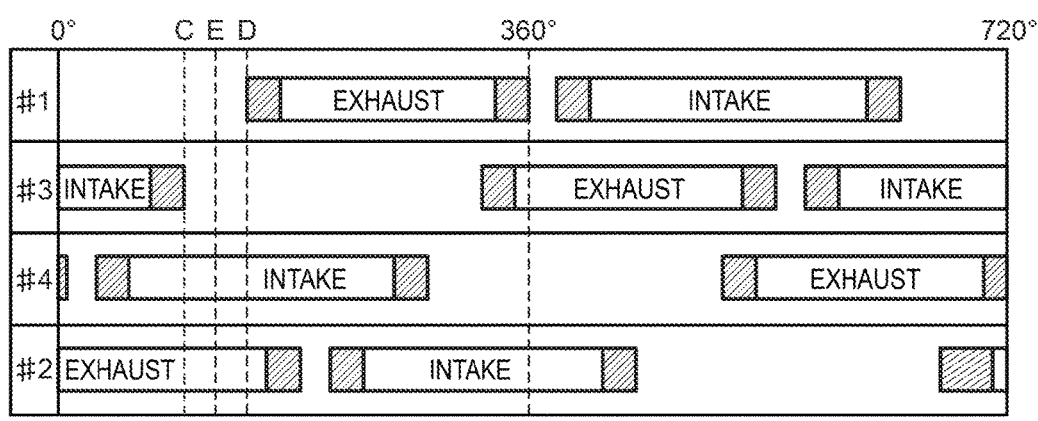
FIG. 5 is a view to describe a range of a target position of a crankshaft at the time of an engine stop.

As illustrated in FIG. 5, the engine 100, which is a series four-cylinder engine, is configured such that a first cylinder, a second cylinder, a third cylinder, and a fourth cylinder are placed in series. An ignition order in this case is an order of the first cylinder, the third cylinder, the fourth cylinder, and the second cylinder.

In FIG. 5, in a rotational range of the crankshaft 116 from 0° CA to 720° CA, a period in which the exhaust valve 120 and the intake valve 118 of each of the cylinders enters an open state is illustrated. In FIG. 5, a rectangular area where "EXHAUST" is described indicates a valve opening period of the exhaust valve 120, and a rectangular area where "INTAKE" is described indicates a valve opening period of the intake valve 118. Shaded parts in both ends of the rectangular area indicative of the valve opening period of the exhaust valve 120 and shaded parts in both ends of the rectangular area indicative of the valve opening period of the intake valve 118 are areas where an opening degree of each valve is in a slight open state (that is, ice is easily formed in a gap between the valve and its corresponding valve seat).

In the present embodiment, a median E between a threshold C and a threshold D is set as the target rotation position for the rotation position of the crankshaft 116. Note that the target rotation position is not limited to the median E in particular, and may be placed at any position between the threshold C and the threshold D. In the present embodiment, since only the valve opening degree of the intake valve 118 can be changed by the electric VVT mechanism 400, the target rotation position may be set on a threshold-C side relative to the median E. With such a configuration, it is possible to set a large margin with respect to a deviation from the target rotation position toward a threshold-D side.

The threshold C and the threshold D are an upper limit and a lower limit of a rotational range of the crankshaft 116, the rotational range being not overlapping with rotational ranges corresponding to the shaded parts of the valve opening periods of the intake valves 118 of all cylinders and rotational ranges corresponding to the shaded parts of valve closing periods of the exhaust valves 120 thereof. Note that the threshold C and the threshold D are not limited to the positions illustrated in FIG. 5 in particular.

The threshold B is an upper limit of a range in which, even if a rotation position of the crankshaft 116 at the time a stop of its rotation largely deviates from the target rotation position, the slight open state can be eliminated by the electric VVT mechanism 400 performing a close operation or an open operation on the intake valve 118, and any sound or shock does not occur along with the operation of the electric VVT mechanism 400. The threshold B is a value of about 90° CA, for example.

The threshold B is set so that the slight open state of the intake valve 118 can be eliminated by the electric VVT mechanism 400 within a range where the opening degree of the valve does not exceed its peak, for example. With such a configuration, it is possible to restrain the occurrence of sound or shock caused when a top part of a cam lobe makes contact with a member that pushes the valve to be opened.

Again referring to FIG. 4, when the stop position determination portion 208 determines that the difference between the rotation position of the crankshaft 116 and the target rotation position is larger than the threshold A but smaller than the threshold B, the VVT controlling portion 210 operates the electric VVT mechanism 400 (the electric actuator 402) so that the valve opening degree reaches the target valve opening degree (hereinafter, such a control is described as a VVT control). The VVT controlling portion 210 controls the electric VVT mechanism 400 so that a cam position CMA detected by the cam angle sensor 300 reaches a target cam position corresponding to the target valve opening degree.

In a case where the valve opening degree reaches the target valve opening degree until a predetermined time elapses after the engine 100 has stopped, the VVT controlling portion 210 finishes the VVT control. At this time, the valve opening degree is maintained at the target valve opening degree. Further, in a case where the predetermined time has elapsed after the stop of the engine 100, the VVT controlling portion 210 finishes the VVT control regardless of the valve opening degree (that is, even if the valve opening degree does not reach the target valve opening degree). Note that the predetermined time is set so as to restrain such a situation that the driver feels uncomfortable due to noise, vibration, and the like caused when the electric VVT mechanism 400 operates for a long time after the engine 100 has stopped.

The target valve opening degree is a valve opening degree that restrains the formation of ice in the gap between the intake valve 118 of each cylinder of the engine 100 and its corresponding valve seat. The formation of ice is caused when the vehicle 1 is left under a low temperature for a long time.

Figure 6:
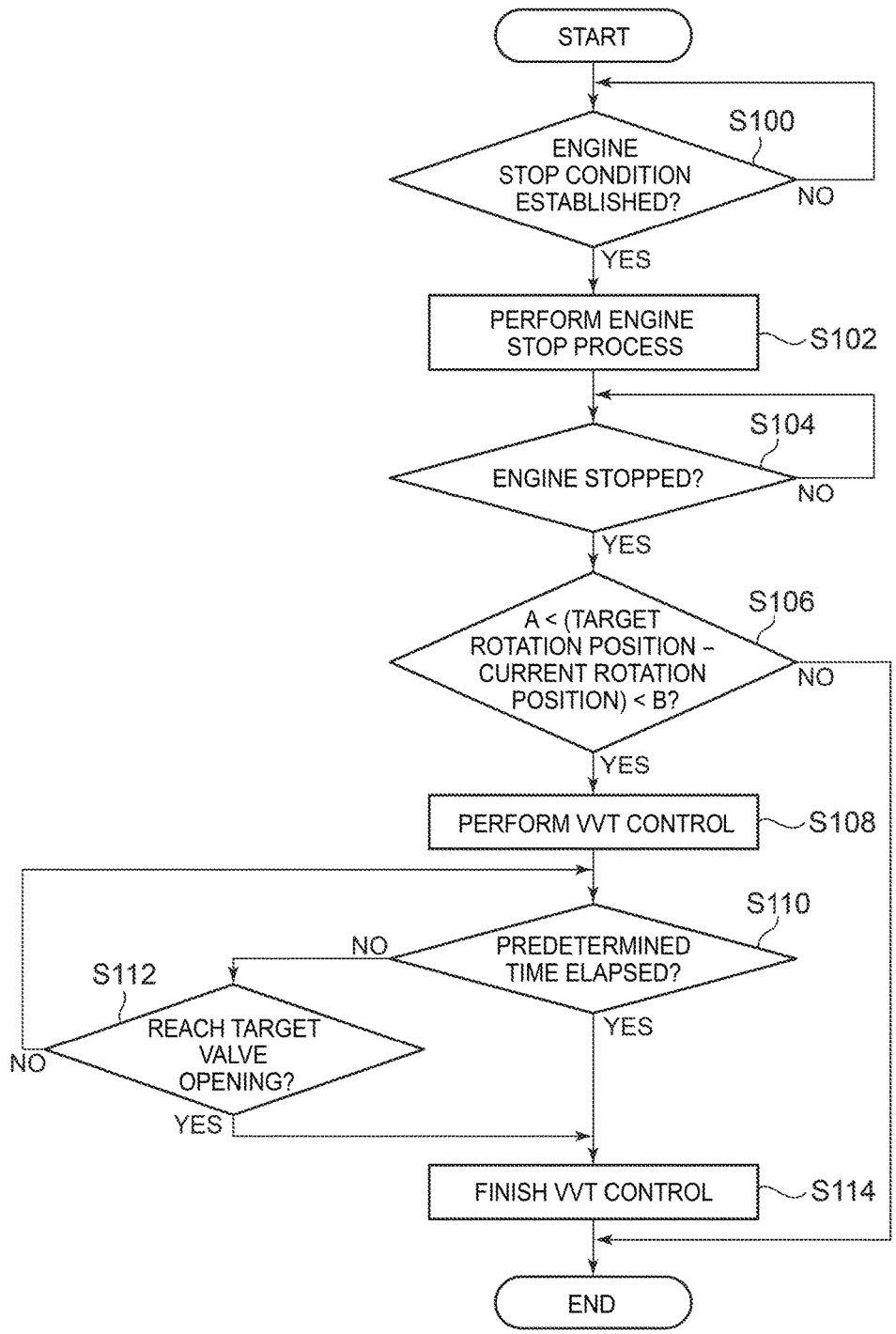
FIG. 6 is a flowchart illustrating a control process executed by a control device.

Referring now to FIG. 6, the following describes a control process executed by the control device 200 provided in the vehicle 1 according to the present embodiment.

In step (hereinafter, "step" is referred to "S") 100, the control device 200 determines whether or not the stop condition of the engine 100 is established. When it is determined that the stop condition of the engine 100 is established (YES in S100), the process is moved to S102. If not (NO in S100), the process is returned to S100.

In S102, the control device 200 performs the stop process on the engine 100. In S104, the control device 200 determines whether or not the engine 100 is in a stop state. When it is determined that the engine 100 is in a stop state (YES in S104), the process is moved to S106. If not (NO in S104), the process is returned to S104.

Note that the stop condition, the stop process on the engine 100, and a method of determining whether or not the engine 100 is in a stop state have been already described above, so detailed descriptions thereof are not repeated herein.

In S106, the control device 200 determines whether a difference between the rotation position of the crankshaft 116 and the target rotation position is larger than the threshold A but smaller than the threshold B, or not. When it is determined that the difference between the rotation position of the crankshaft 116 and the target rotation position is larger than the threshold A but smaller than the threshold B (YES in S106), the process is moved to S108. If not (NO in S106), the process is finished. In S108, the control device 200 performs the VVT control by use of the electric VVT mechanism 400.

In S110, the control device 200 determines whether or not a predetermined time has elapsed after the stop of the engine 100. When it is determined that the predetermined time has elapsed after the stop of the engine 100 (YES in S110), the process is moved to S114. If not (NO in S110), the process is moved to S112.

In S112, the control device 200 determines whether or not the valve opening degree has reached the target valve opening. When it is determined that the valve opening degree has reached the target valve opening (YES in S112), the process is moved to S114. If not (NO in S112), the process is returned to S110. In S114, the control device 200 finishes the VVT control.

Figure 7:
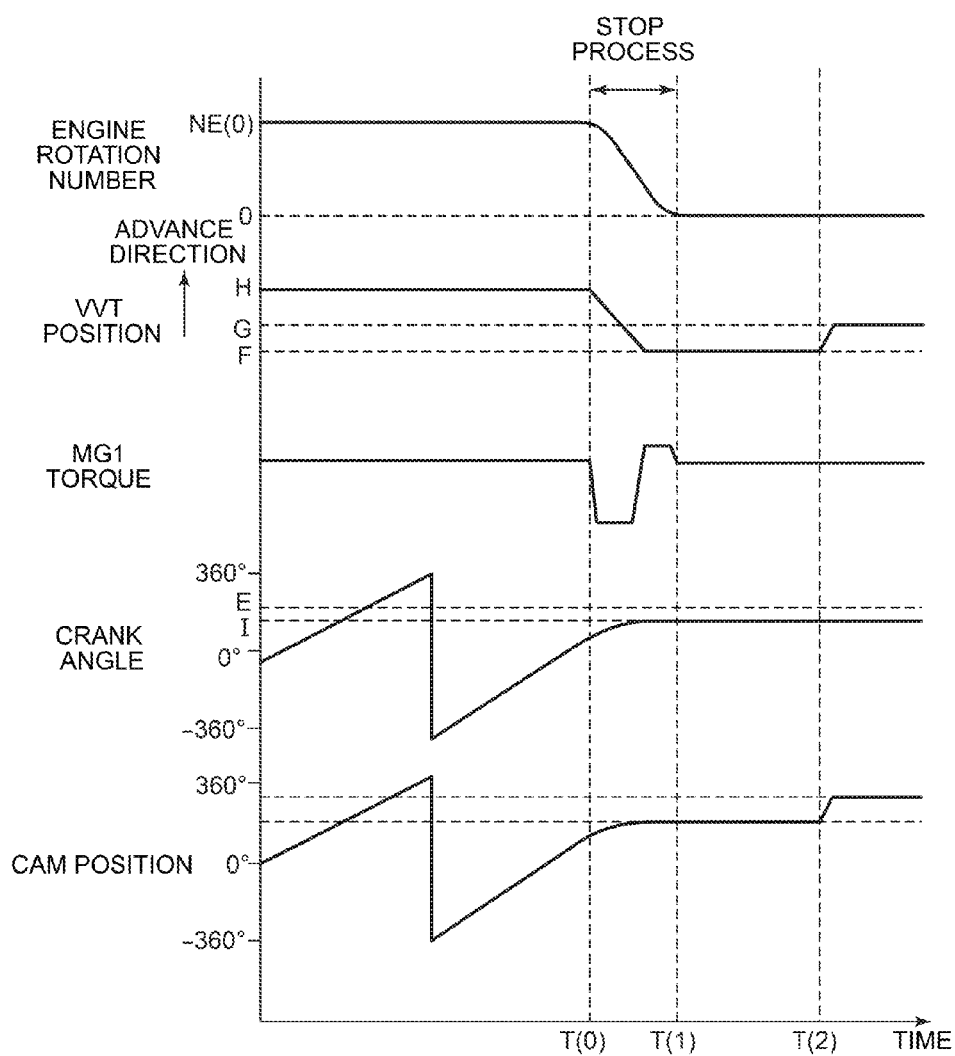
FIG. 7 is a timing chart illustrating an operation of the control device.

An operation of the control device 200 provided in the vehicle 1 according to the present embodiment based on the above configuration and the flowchart will be described with reference to FIGS. 7 and 8. Note that a horizontal axis in FIG. 7 indicates time, and a vertical axis in FIG. 7 indicates any of the engine rotation number NE, the VVT position, the MG1 torque, a rotation position CRA of the crankshaft 116, and a cam position CMA.

For example, it is assumed that the engine 100 rotates at a rotation number NE(0) as the engine rotation number NE, and the VVT position is a VVT position H in accordance with the waveform IN1 indicative of the most advanced valve opening period. At the time when the engine 100 rotates, the engine 100 rotates with the rotation position of the crankshaft 116 being in synchronous with the rotation position of the camshaft. After each of the rotation positions of the crankshaft 116 and the camshaft changes from −360° CA to 360° CA, the each of the rotation positions starts to change from −360° CA. As long as the engine 100 continues rotating, such a change is repeated.

When the stop condition of the engine 100 is established such that the driver operates the start switch 250 so as to request interruption of power supply to an electric device provided in the vehicle 1 at a time T(0) (YES in S100), for example, the stop process is performed on the engine 100 (S102). By the execution of the stop process, the fuel injection is stopped, and the electric VVT mechanism 400 is controlled so that the VVT position reaches a VVT position F in accordance with the waveform IN2 indicative of the most retarded valve opening period. Further, after the engine rotation number NE is decreased immediately by a torque control of the motor generator MG1, the rotation position of the crankshaft 116 is controlled to stop at the target rotation position.

When the engine 100 enters a stop state at a time T(1) (YES in S104), it is determined whether the difference between a target rotation position E of the crankshaft 116 and a current rotation position I thereof is larger than the threshold A but smaller than the threshold B, or not (S106). When it is determined that the difference is larger than the threshold A but smaller than the threshold B (YES in S106), the VVT control is performed at a time T(2) (S108).

When the VVT control is performed, the VVT position is advanced from the VVT position F to a VVT position G corresponding to a target position (the target valve opening degree). Hereby, the rotation position of the camshaft increases only by an amount corresponding to the change of the VVT position. When the VVT position reaches the target position (YES in S112) before the predetermined time elapses (NO in S110), the VVT control is finished (S114). Note that, when the predetermined time has elapsed before the VVT position reaches the target position (YES in S110), the VVT control is finished regardless of the VVT position (S114).

Figure 8:
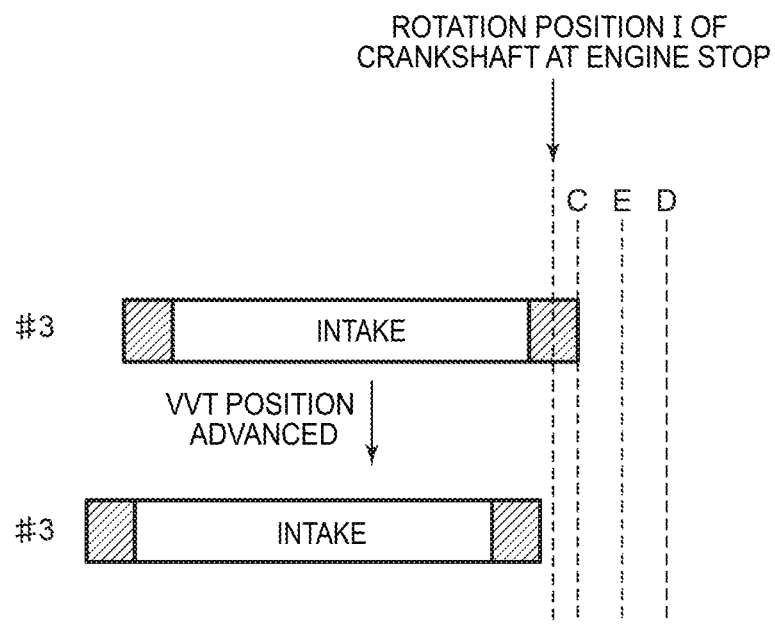
FIG. 8 is a view to describe an operation of the intake valve when a VVT control is executed after an engine stop.

As illustrated in FIG. 8, it is assumed that the rotation position I of the crankshaft 116 at the time when the engine 100 stops largely deviates from the median E as the target rotation position by more than the threshold A. In this case, the rotation position I of the crankshaft 116 that is stopped is within a rotational range corresponding to a shaded part of the valve opening period of the intake valve 118 of the third cylinder, that is, the intake valve 118 of the third cylinder is in a slight open state. On that account, when the VVT position is changed to the target position, the valve opening period of the intake valve 118 of the third cylinder is advanced as illustrated in FIG. 8. Accordingly, the intake valve 118 of the third cylinder is closed at the rotation position of the crankshaft 116 thus stopped. Hereby, the slight open state of the intake valve 118 of the third cylinder is eliminated.

As described above, even after the engine 100 has stopped, the electric VVT mechanism 400 can be operated until the valve opening degree reaches a position that restrains a slight open state in which ice is formed in a gap between each of the intake valve 118 and the exhaust valve 120 and its corresponding valve seat. This accordingly makes it possible to restrain the occurrence of noise, vibration, and the like caused due to freezing in the valve at the time of a next start of the engine 100. Accordingly, it is possible to provide a control device for a vehicle, the control device being configured to highly accurately adjust opening degrees of an intake valve and an exhaust valve at the time of an engine stop.

Further, when the predetermined time has elapses after the stop of the engine 100, the VVT control is finished regardless of the valve opening degree (that is, even if the valve opening degree does not reach the target valve opening degree). Accordingly, it is possible to restrain such a situation that the driver feels uncomfortable due to noise, vibration, and the like caused when the electric VVT mechanism 400 operates for a long time after the engine 100 has stopped.

Next will be described modifications of the present embodiment. The present embodiment has described that the vehicle 1 is a hybrid vehicle. However, the vehicle 1 is also applicable to a vehicle except the hybrid vehicle, such as a vehicle that uses only the engine 100 as a drive source.

Further, in the present embodiment, the motor generators MG1, MG2 are connected to the crankshaft 116 of the engine 100 via the planetary gear mechanism that constitutes the power distribution device 4. Accordingly, instead of using the crank angle sensor 302 to obtain the rotation position of the crankshaft 116, the rotation position of the crankshaft 116 may be obtained from a rotation position of the motor generator MG1 or the motor generator MG2. Note that the rotation position of the motor generator MG1 and the rotation position of the motor generator MG2 can be detected by a resolver or the like.

The present embodiment has described that the threshold A is a threshold to be set from the viewpoint of whether a slight open state in which freezing may occur in the gap of the valve is caused or not. However, the threshold A may be set from the viewpoint of whether a start shock of the engine 100 gets worse or not, instead of or in addition to whether the valve comes into the slight open state or not. In a case where an outside temperature is higher than a threshold, for example, the threshold A may be set from the viewpoint of whether a start shock of the engine 100 gets worse or not, and in a case where the outside temperature is lower than the threshold, the threshold A may be set from the viewpoint of whether the valve comes into the slight open state or not.

The present embodiment has described that the slight open state of the intake valve 118 is eliminated by advancing or retarding the VVT position of the intake valve 118. However, in a case where the electric VVT mechanism 400 can advance or retard the valve opening period of the exhaust valve 120 in addition to the intake valve 118, a slight open state of the exhaust valve 120 may be eliminated by advancing or retarding the valve opening period of the exhaust valve 120 in addition to the intake valve 118.

The present embodiment has described that the electric actuator 402 changes a rotation phase between the camshaft and the cam sprocket on the intake side. However, instead of the electric VVT mechanism 400, a hydraulic VVT mechanism and an electric oil pump that supplies a hydraulic pressure to the hydraulic VVT mechanism may be included.

The hydraulic VVT mechanism changes the rotation phase between the camshaft and the cam sprocket on the intake side by a hydraulic pressure supplied from a hydraulic circuit including the electric oil pump. When the hydraulic pressure is supplied from the hydraulic circuit to the hydraulic VVT mechanism by the operation of the electric oil pump, the hydraulic VVT mechanism is operable even when the engine 100 is in a stop state. On that account, such a configuration also allows elimination of the slight open state of the intake valve at the time of an engine stop.

The hydraulic VVT mechanism includes an advance-side oil passage, a retard-side oil passage, and an oil control valve (hereinafter referred to as the OCV), for example. The OCV operates so as to switch, by use of an electromagnetic solenoid, a supply destination of the hydraulic pressure supplied from the hydraulic circuit to either one of the advance-side oil passage and the retard-side oil passage, and to connect the other one thereof to a discharge oil passage (hereinafter, such an operation is described as a switching operation). On that account, in a case where the hydraulic pressure is supplied to the advance-side oil passage, oil of the retard-side oil passage is discharged from the discharge oil passage. Hereby, the rotation phase between the camshaft and the cam sprocket on the intake side is changed to the advance side. In the meantime, in a case where the hydraulic pressure is supplied to the retard-side oil passage, oil of the advance-side oil passage is discharged from the discharge oil passage. Hereby, the rotation phase between the camshaft and the cam sprocket on the intake side is changed to the retard side.

In the present embodiment, a control to generate a torque of the motor generator MG1 so that the rotation position of the crankshaft 116 reaches the target rotation position during the stop process on the engine 100 is performed as the crankshaft stop position control. However, the crankshaft stop position control is not limited to such a control, in particular. For example, the crankshaft stop position control may be a control to cause the rotation position of the crankshaft 116 to reach the target rotation position by changing a timing of stopping the fuel injection or causing a rotation load by use of accessories such as an air conditioner compressor, for example.

The present embodiment has described that the electric VVT mechanism 400 is operated after the engine 100 has stopped. However, the electric VVT mechanism 400 may be operated after the engine 100 has stopped but before a predetermined time elapses, and after a time point when the predetermined time has elapsed, the operation of the electric VVT mechanism 400 may be stopped. With such a configuration, it is possible to restrain such a situation that the driver feels uncomfortable due to noise, vibration, and the like caused when the electric VVT mechanism 400 operates for a long time after the engine 100 has stopped.

Note that all of or some of the above modifications may be performed in combination. It should be considered that the embodiment described herein is just an example in all respects and is not limitative. A scope of the present invention is shown by Claims, not by the descriptions, and intended to include all modifications made within the meaning and scope equivalent to Claims.

What is claimed is:

1. A control device for a vehicle, the vehicle including an engine, the engine including an intake valve, an exhaust valve, a first valve seat corresponding to the intake valve, a second valve seat corresponding to the exhaust valve, a crankshaft, a camshaft and an electric variable valve timing mechanism, the electric variable valve timing mechanism being configured to change a rotational phase of the camshaft relative to the crankshaft so as to change a valve timing of at least either one of the intake valve and the exhaust valve, the control device comprising:
an electronic control unit configured to:
perform a crankshaft stop position control to control a rotation stop position of the crankshaft during a stop process of stopping the engine, such that a valve opening degree in which at least either one of a first gap between the intake valve and the first valve seat and a second gap between the exhaust valve and the second valve seat is fully closed or becomes a predetermined gap or more is set as a target valve opening degree; and
operate the electric variable valve timing mechanism until the valve opening degree reaches the target valve opening degree, when the engine stops.

2. The control device according to claim 1, wherein the electronic control unit is configured such that, in a case where a magnitude of a difference between the valve opening degree and the target valve opening degree is larger than a first threshold when the engine stops, the electronic control unit is configured to operate the electric variable valve timing mechanism until the valve opening degree reaches the target valve opening degree.

3. The control device according to claim 2, wherein:
the electronic control unit is configured such that in a case where the magnitude of the difference between the valve opening degree and the target valve opening degree is smaller than a second threshold when the engine stops, the electronic control unit is configured to operate the electric variable valve timing mechanism until the valve opening degree reaches the target valve opening degree; and
the second threshold is a value larger than the first threshold.

4. The control device according to claim 3, wherein
the second threshold is set within a range in which the valve opening degree does not exceed its peak when the valve opening degree is changed to the target valve opening degree.

5. The control device according to claim 1, wherein
the vehicle further includes a rotary electric machine that is able to rotate the crankshaft;
the electronic control unit is configured to perform the crankshaft stop position control during the stop process, the crankshaft stop position control being a control to operate the rotary electric machine so that the rotation stop position of the crankshaft reaches a predetermined position; and
the electronic control unit is configured to operate the electric variable valve timing mechanism until the valve opening degree reaches the target valve opening degree, when the engine stops.

6. The control device according to claim 1, wherein
the electronic control unit is configured to operate the electric variable valve timing mechanism until a predetermined time elapses, after the engine has stopped.

7. The control device according to claim 1, wherein
the vehicle further includes an electric device;
the electronic control unit is configured to execute the stop process when an interruption of power supply to the electric device is requested; and
the electronic control unit is configured to operate the electric variable valve timing mechanism until the valve opening degree reaches the target valve opening degree, after the engine has stopped.

8. The control device according to claim 1, wherein
the target valve opening degree is a valve opening degree that restrains formation of ice in the first gap and the second gap.

9. The control device according to claim 1, wherein
the vehicle further includes a detection device that detects a rotation position of the crankshaft; and
the electronic control unit is configured to calculate the valve opening degree based on the rotation position of the crankshaft which is detected by the detection device.

10. A control method for a vehicle, the vehicle including an engine, the engine including an intake valve, an exhaust valve, a first valve seat corresponding to the intake valve, a second valve seat corresponding to the exhaust valve, a crankshaft, a camshaft and an electric variable valve timing mechanism, the electric variable valve timing mechanism being configured to change a rotational phase of the camshaft relative to the crankshaft so as to change a valve timing of at least either one of the intake valve and the exhaust valve, the control method comprising:
controlling a rotation stop position of the crankshaft during a stop process of stopping the engine, such that a valve opening degree in which at least either one of a first gap between the intake valve and the first valve seat and a second gap between the exhaust valve and the second valve seat is fully closed or becomes a predetermined gap or more is set as a target valve opening degree; and
operating the electric variable valve timing mechanism until the valve opening degree reaches the target valve opening degree, when the engine has stopped.

* * * * *